(12) United States Patent
Sawamoto

(10) Patent No.: US 7,170,691 B2
(45) Date of Patent: Jan. 30, 2007

(54) ZOOM LENS SYSTEM

(75) Inventor: Akira Sawamoto, Suwa (JP)

(73) Assignee: Nittoh Kogaku K.K. (JP)

( * ) Notice: Subject to any disclaimer, the term of this patent is extended or adjusted under 35 U.S.C. 154(b) by 0 days.

(21) Appl. No.: 11/289,816

(22) Filed: Nov. 30, 2005

(65) Prior Publication Data
US 2006/0139766 A1 Jun. 29, 2006

(30) Foreign Application Priority Data
Dec. 3, 2004 (JP) ............................. 2004-350861

(51) Int. Cl.
*G02B 15/14* (2006.01)
(52) U.S. Cl. ...................................... 359/680; 359/684
(58) Field of Classification Search ................ 359/676, 359/683, 684, 680–682
See application file for complete search history.

(56) References Cited

U.S. PATENT DOCUMENTS 6,515,803 B2 * 2/2003 Hirose ......................... 359/682

6,545,817 B2 * 4/2003 Hirose ......................... 359/683

FOREIGN PATENT DOCUMENTS

JP 2002-148516 5/2002

* cited by examiner

*Primary Examiner*—Scott J. Sugarman
(74) *Attorney, Agent, or Firm*—Thompson Hine LLP

(57) ABSTRACT

A zoom lens system that includes lens groups G1 to G5 that have negative, positive, positive, negative and positive refractive power respectively in the order from a screen side is provided. The fourth lens group G4 includes a cemented lens made up of a negative lens that is concave on the screen side and a convex lens. The zoom lens system satisfies conditions below $1.15 < f2/fw < 2.0$ $50 < \Delta vd4 < 70$ where fw is a combined focal length of the zoom lens system at a wide-angle end, f2 is a combined focal length of the second lens group, and $\Delta vd4$ is a difference in the respective Abbe numbers vd of lenses composing the cemented lens in the fourth lens group G4.

6 Claims, 4 Drawing Sheets

ZOOM LENS SYSTEM

CROSS-REFERENCE TO RELATED APPLICATION

This application is based upon and claims the benefit of priority from the prior Japanese Patent Application No. 2004-350861, filed Dec. 3, 2004, the entire contents of which are incorporated herein by reference.

BACKGROUND

The present invention relates to a zoom lens system composed of five lens groups.

A projector includes a light valve (image generating device) with LCD panels or the like, a projection zoom lens system, a dichroic prism or a TIR prism. The dichroic prism or the TIR prism combines rays expressing an image divided into colors outputted by the light valve. The projection zoom lens system needs to be telecentric on the image side for projecting the combined light onto a screen. For this reason, one of the types of the projection zoom lens system is a zoom lens system composed of five lens groups with negative, positive, positive, negative, and positive refractive powers disposed in that order from the screen side. During zooming, the first lens group and the fifth lens group would be fixed and the second, third, and fourth lens groups would move along the optical axis to change the distances between the lenses and in turn the size of the projected images.

A projection zoom lens system for a projector using LCD panel or panels needs to be telecentric on the image (input) side, to favorably correct various types of aberration, and also to be compact and have a predetermined back focus. To satisfy these demands, a suitable power balance for the respective lens groups should be found and the constructions of the respective lens groups should be determined.

In recent years, to make lens systems more compact, there has been a strong tendency to increase the power of the first lens group positioned closest to the screen, which makes it difficult to achieve a suitable focus adjusting performance. In more detail, in a mechanism where focus adjustments are made moving the first lens group, if the first lens group is too powerful, the aberration correcting performance will fluctuate according to changes of position of the first lens group, and therefore it becomes difficult to get favorable aberration correcting performance and favorable focus adjusting performance at the same time. Also, when the first lens group is powerful, the sensitivity of focus adjustments relative to distance will be too high, which makes focus adjusting operations by manual or mechanisms difficult. A mechanism that can overcome such difficulties would be so complex, with the mechanism, it would be difficult to realize a compact zoom lens system.

One of the important types of aberration that needs to be corrected in a zoom lens system is chromatic aberration. Cemented lenses that are respectively composed of a negative lens and a positive lens and have a high correcting performance for chromatic aberration are disposed in a number of lens groups so that the respective lens groups correct chromatic aberration together with the other types of aberration. However, compared to correcting an aberration of green light that has a substantially central frequency band of visible light, it is difficult to simultaneously correct aberrations of both red light that is low frequency light and blue light that is high frequency light suitably. Many lens systems attempt to correct red light during zooming using the second lens group that is moved during a zooming operation. To do so, the second lens group needs to have a fairly high refractive power, and to correct the aberration due to such refractive power, the first lens group also requires a fairly high refractive power. For this reason also, it is difficult to reduce the refractive power of the first lens group.

In the lens system described in Japanese Laid-Open Patent Publication No. 2002-148516, a cemented lens is provided in the third lens group as well as in the fourth lens group to reduce the chromatic aberration-correcting load of the second lens group. Such arrangement simplifies the construction of the second lens group and reduces the power of the second lens group and reduces the power of the first lens group in turn.

SUMMARY

It is an object of the present invention to provide a zoom lens system where the overall construction is simplified and made compact and where the power of the first lens group is suitably suppressed to facilitate focus adjustments.

One of aspects of the present invention is a zoom lens system that projects, onto a screen, projection light from an image generating device. The zoom lens system includes, in order from a screen side thereof, a first lens group with a negative refractive power, a second lens group with a positive refractive power, a third lens group with a positive refractive power, a fourth lens group with a negative refractive power, and a fifth lens group with a positive refractive power, where zooming is performed by moving the second, third and fourth lens groups. The fourth lens group is composed of a negative meniscus lens that is concave on an image side, a cemented lens made up of a negative lens that is concave on the screen side and a convex lens, and a positive lens. The zoom lens system also satisfies the conditions below.

$$1.15 < f2/fw < 2.0 \quad \text{(A)}$$

$$50 < \Delta vd4 < 70 \quad \text{(B)}$$

Here, fw represents the focal length of the entire zoom lens system at a wide-angle end thereof, f2 represents the combined focal length of the second lens group, and $\Delta vd4$ represents the difference in the respective Abbe numbers vd of the lenses composing the cemented lens in the fourth lens group.

When the difference in the respective Abbe numbers vd of the lenses composing the cemented lens is too low, it is not possible to obtain a sufficient chromatic aberration correcting performance for red rays, while when the difference is too high, blue rays are corrected excessively, which is also undesirable. Accordingly, in a system where the load of correcting chromatic aberration is distributed among the respective lens groups, the difference in the respective Abbe numbers vd of the lenses composing the cemented lens is around 30 to 40, and around 45 at most.

In the zoom lens system according to the present invention, the difference $\Delta vd4$ between the respective Abbe numbers of the lenses composing the cemented lens in the fourth lens group is at 50 or above, so that red rays are corrected sufficiently and blue rays are corrected a touch excessively. Therefore, other groups are designed mainly to correct the blue rays. Conversely, setting $\Delta vd4$ at 70 or above is not preferable since blue rays are corrected excessively and correction by the other lens groups becomes difficult.

By setting the difference $\Delta vd4$ at 50 or above, the second and third lens groups having relatively simpler constructions and lower powers are applicable. It becomes possible to correct chromatic and other types of aberration with the power of the second lens group suppressed to the range shown by condition (A) given above. That is, sufficient aberration-correcting performance is obtained in a range where the power of the second lens group does not fall below the lower limit of condition (A). At a condition exceeds the upper limit of condition (A), the power becomes insufficient for various types of aberration to be corrected.

One of preferable arrangements of this lens system includes the second lens group being composed of two positive meniscus lenses and the third lens group being composed of a positive lens. The lens system can easily be made compact.

It is preferable that a combined focal length f1 of the first lens group and the combined focal length fw of the zoom lens system at the wide-angle end satisfy the condition (C) below. It is more preferable that the combined focal length f1 of first lens group and the combined focal length fw of the zoom lens system at the wide-angle end satisfy the condition (D) below. Acceptable aberration performance can be obtained for a high-magnification, wide-field angle lens system.

$$0.5 < |f1/fw| < 2.0 \quad (C)$$

$$1.0 < |f1/fw| < 2.0 \quad (D)$$

By suppressing the power of the first lens group, focus adjustments made by moving the first lens group can be carried out easily, and therefore it is possible to provide a zoom lens system where focus adjustments are not excessively sensitive and focus adjustments can also be made easily during zooming. It is possible to prevent the focus adjusting mechanism from becoming complex. In addition, the lens system according to the present invention has a simple construction and therefore can easily be made compact.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

DESCRIPTION

Figure 1A:
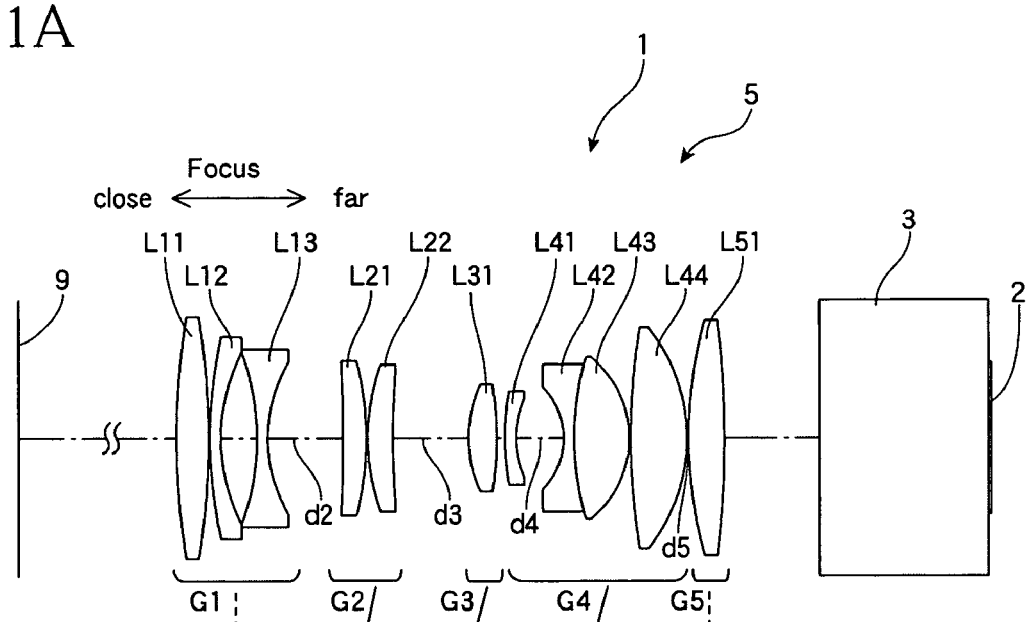
FIGS. 1A and 1B show arrangements of a lens system and a projector according to the one of aspects of the present invention, with FIG. 1A showing the arrangement of lenses at the wide-angle end and FIG. 1B showing the arrangement of lenses at the telephoto end.
Figure 1B:
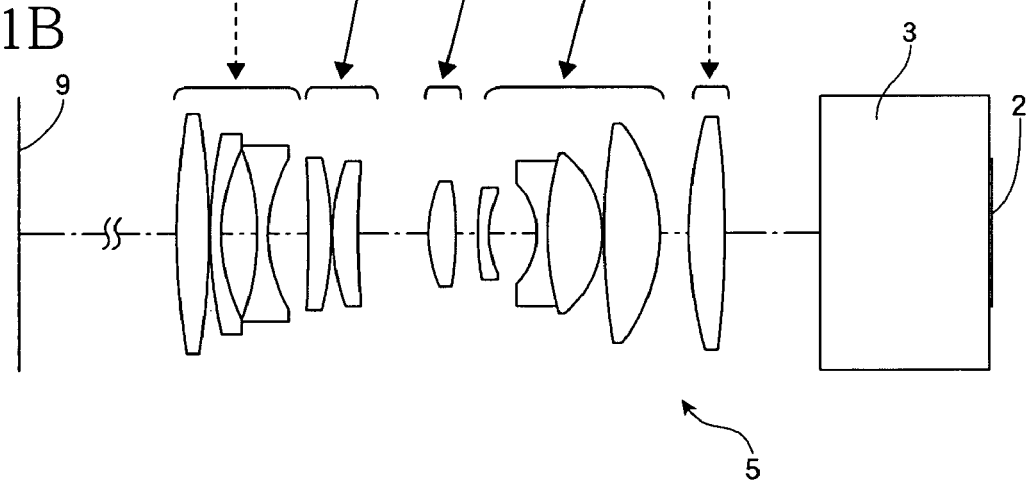

FIGS. 1A and 1B schematically show the overall construction of a zoom lens system 5 and a projector apparatus 1 with the zoom lens system 5. The projector apparatus 1 displays an image onto an external screen 9 and includes an image generating device (light valve) with LCDs 2 (one LCD is shown) that modulate light to generate images of each color respectively, a dichroic prism 3 that combines color images for generating multi color images, and the zoom lens system 5 that projects the projection light generated by the prism 3 toward the screen 9. The image generating device includes a self-light-emitting type device and non-self-emitting type that includes a light source composed of a halogen lamp or the like, that is not shown in FIGS. 1A and 1B, for generating light having sufficient intensity for projection.

The zoom lens system 5 is composed of a total of eleven lenses numbered L11 to L51 that are grouped into five groups numbered G1 to G5 in order from the side of the screen 9. FIG. 1A shows the arrangement of the respective lenses at the wide-angle end where images are displayed having been magnified and FIG. 1B shows the arrangement of the respective lenses at a telephoto end that is a standard state. These five lens groups G1 to G5 arranged in that order from the screen 9 side respectively have negative, positive, positive, negative, and positive refractive powers, the lens system 5 is a combination of retrofocus type lens systems and has telecentric image input side facing the LCD 2 of the image generating device. The lens system 5 is designed to be able to clearly project the images generated by the LCD 2.

The first lens group G1 disposed closest to the screen 9 has an overall negative refractive power and in order from a screen 9 side thereof is composed of a positive lens L11, a negative meniscus lens L12 that is convex on the screen side, and a negative lens L13.

The second lens group G2 has an overall positive refractive power and is composed of two lenses that in order from a screen 9 side thereof are a positive meniscus lens b21 that is concave on the screen side and a positive meniscus lens L22 that is convex on the screen side. The third lens group G3 has an overall positive refractive power and is composed of a single biconvex positive lens L31.

The fourth lens group G4 has an overall negative refractive power and is composed of four lenses that in order from a screen 9 side thereof are a negative meniscus lens L41 that is convex on the screen side and concave on the image side, a cemented lens made up of a negative lens L42 that is concave on the screen side and a convex lens L43, and a positive lens L44. The fifth lens group G5 has an overall positive refractive power and is composed of a single positive lens L51.

As shown in FIG. 1, during zooming, that is when the magnification is changed from the wide-angle end to the telephoto end, in the zoom lens system 5, the first lens group G1 and the fifth lens group G5 are fixed and the second lens group G2, the third lens group G3, and the fourth lens group G4 move with predetermined ratios toward the screen 9. During focusing, the first lens group G1 moves backward and forward.

In the lens data shown below, "Rdy" represents the radius of curvature (mm) of each lens in order from the screen side, "Thi" represents the distance (mm) between the respective lens surfaces in order from the screen side, "Type" shows the lens type with "SPH" indicating a spherical lens, "nd" represents the refractive index (d line) of each lens, "vd" represents the Abbe number (d line) of each lens. The expression "FLAT" indicates a flat surface.

The distances that change according to the magnification are respectively the distance d2 between the first lens group G1 and the second lens group G2, the distance d3 between the second lens group G2 and the third lens group G3, the distance d4 between the third lens group G3 and the fourth lens group G4, and the distance d5 between the fourth lens group G4 and the fifth lens group G5. Since a stop (aperture)

S moves together with the fourth lens group G4, the distance d4 represents the distance between the third lens group G3 and the stop S. The distances are values for the case where the distance between the screen 9 and the lens closest to the screen is 3500 mm.

LENS DATA

| No. | Rdy | Type | Thi | nd | vd | |
|---|---|---|---|---|---|---|
| 1 | 149.188 | SPH | 5.94 | 1.74400 | 44.79 | lens L11 |
| 2 | −149.188 | SPH | 0.25 | | | |
| 3 | 91.348 | SPH | 2.00 | 1.60311 | 60.64 | lens L12 |
| 4 | 37.705 | SPH | 6.64 | | | |
| 5 | −49.307 | SPH | 2.00 | 1.48749 | 70.24 | lens L13 |
| 6 | 29.881 | SPH | d2 | | | |
| 7 | −346.266 | SPH | 4.28 | 1.74400 | 44.79 | lens L21 |
| 8 | −61.427 | SPH | 0.25 | | | |
| 9 | 43.820 | SPH | 4.62 | 1.74950 | 35.28 | lens L22 |
| 10 | 168.165 | SPH | d3 | | | |
| 11 | 25.895 | SPH | 5.11 | 1.48749 | 70.24 | lens L31 |
| 12 | −63.370 | STO | d4 | | | stop S |
| 13 | 54.272 | SPH | 2.00 | 1.75520 | 27.51 | lens L41 |
| 14 | 19.303 | SPH | 8.88 | | | |
| 15 | −14.292 | SPH | 2.00 | 1.75520 | 27.51 | lens L42 |
| 16 | 57.145 | SPH | 10.19 | 1.49700 | 81.54 | lens L43 |
| 17 | −20.494 | SPH | 0.25 | | | |
| 18 | 132.937 | SPH | 10.38 | 1.48749 | 70.24 | lens L44 |
| 19 | −35.489 | SPH | d5 | | | |
| 20 | 88.115 | SPH | 6.61 | 1.84666 | 23.78 | lens L51 |
| 21 | −190.346 | SPH | 15.00 | | | |
| 22 | FLAT | SPH | 31.00 | 1.51633 | 64.14 | prism 3 |

The distances (mm) between the respective lens groups as follows.

| | wide-angle end | intermediate position | telephoto end |
|---|---|---|---|
| d2 | 13.79 | 10.26 | 7.33 |
| d3 | 13.99 | 13.41 | 12.86 |
| d4 | 1.51 | 2.76 | 4.08 |
| d5 | 0.30 | 3.16 | 5.32 |

Various focal lengths for the respective lens groups are as follows.

| | |
|---|---|
| f1 (combined focal length of the first lens group) | −41.296 |
| f2 (combined focal length of the second lens group) | 43.185 |
| fw (focal length of the entire lens system at the wide-angle end) | 34.49 |
| ft (focal length of the entire lens system at the telephoto end) | 41.40 |
| Half-field angle | 23 |
| Zoom ratio | 1.20 |
| Backfocus | 49.0 |

Accordingly, the values of the conditions (A) to (D) given above are as follows.
Condition (A) (f2/fw): 1.25
Condition (B) ($\Delta vd4$): 54.03
Condition (C and D) (|f1/fw|): 1.19

The zoom lens system 5 satisfies both Conditions (A) and (B), and various kinds of aberration including chromatic aberration are favorably corrected. The refractive power of the first lens group is suppressed while realizing a wide-angle lens with a half-field angle of 23° or above and a high zooming ration of 1.2.

Figure 2:
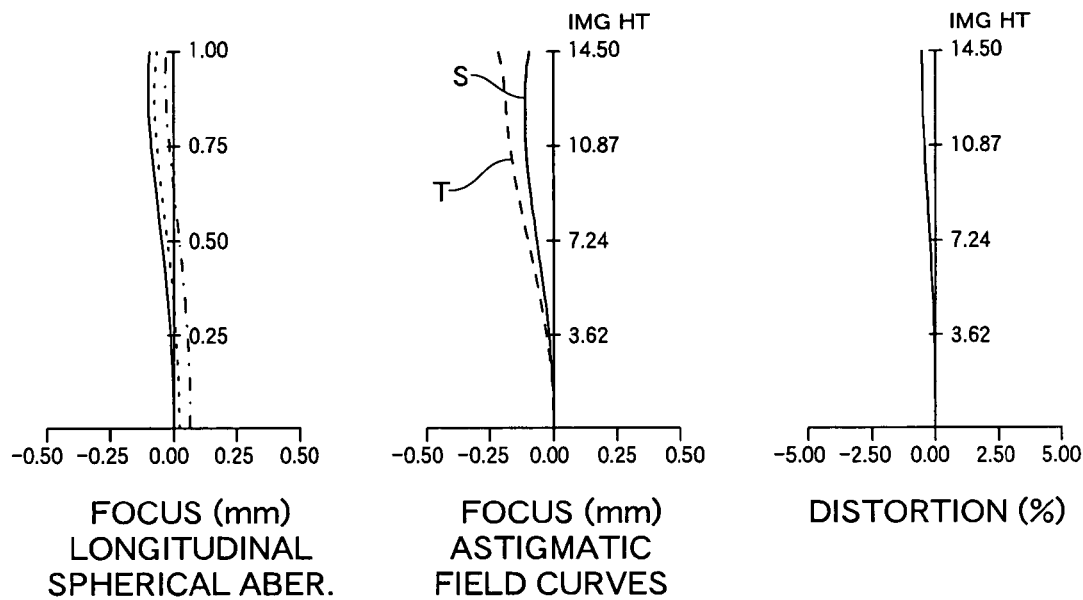
FIG. 2 shows the longitudinal aberrations of the zoom lens system shown in FIG. 1 at the wide-angle end.
Figure 3:
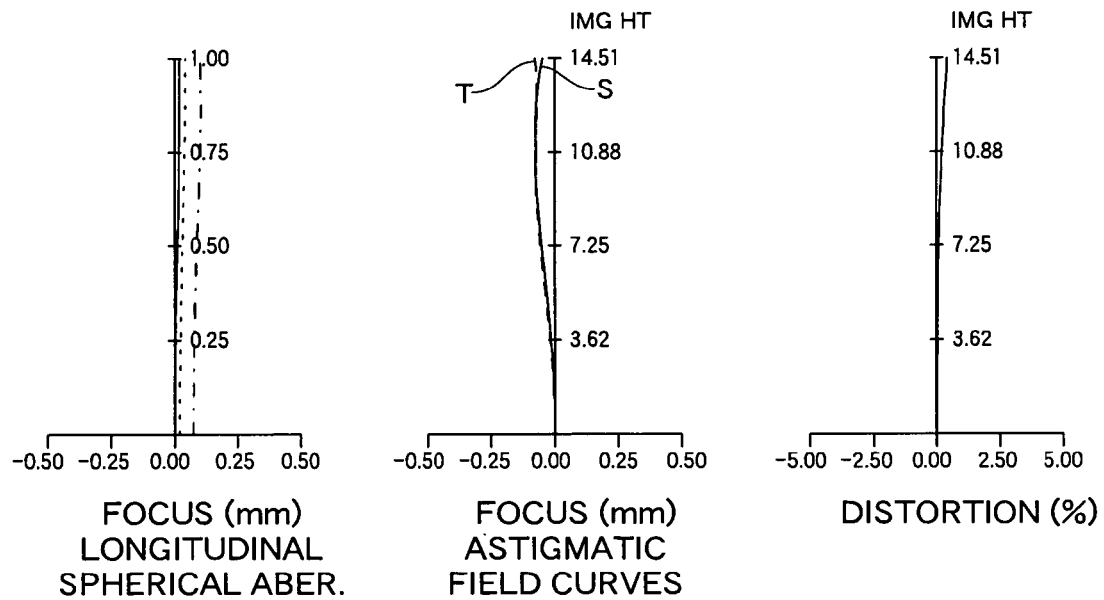
FIG. 3 shows the longitudinal aberrations of the zoom lens system shown in FIG. 1 at the telephoto end.

FIG. 2 shows the spherical aberration, astigmatism, and distortion of the projection zoom lens system 5 at the wide-angle end. FIG. 3 shows the spherical aberration, astigmatism, and distortion of the zoom lens system 5 at the telephoto end.

Figure 4:
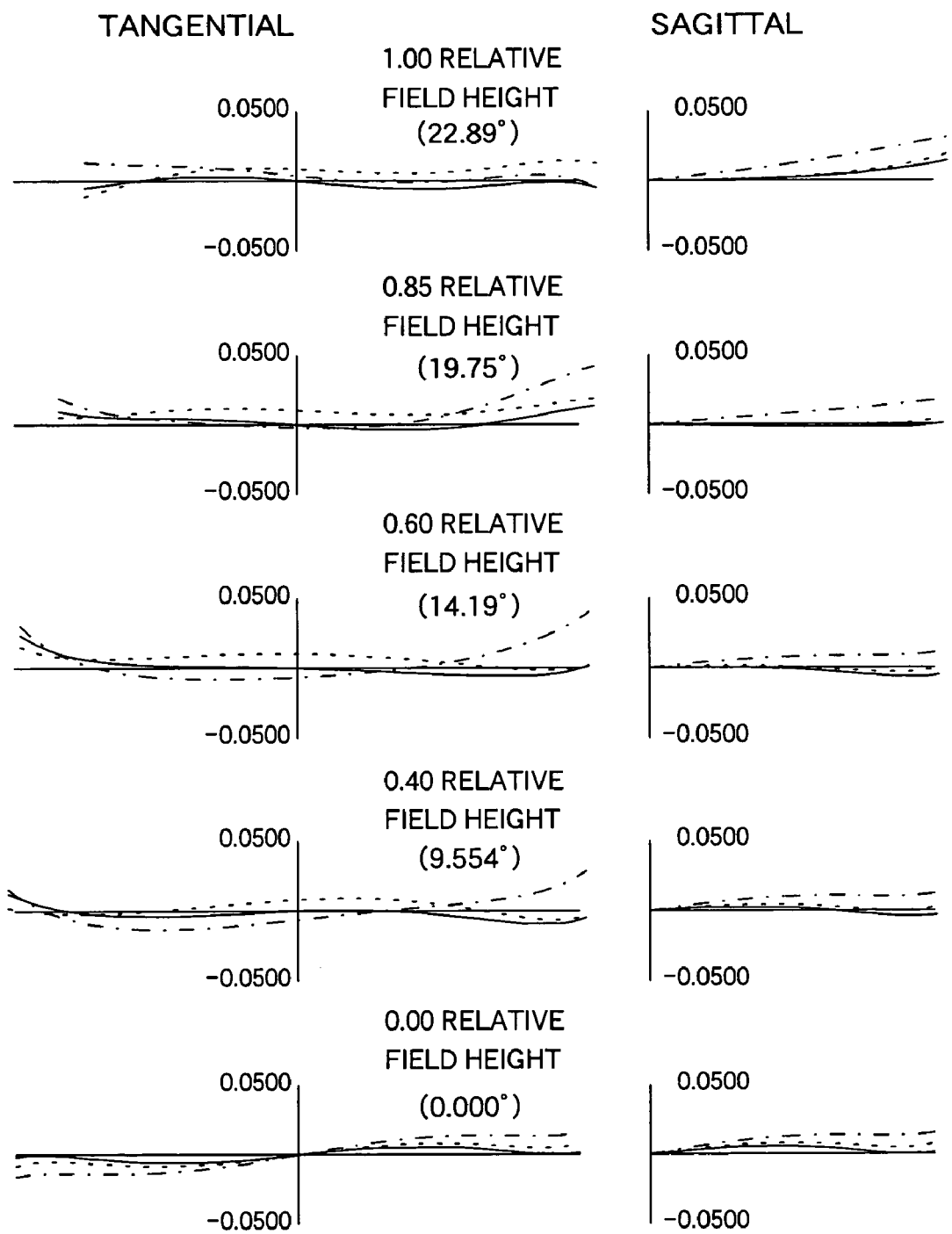
FIG. 4 shows the lateral aberrations of the zoom lens system shown in FIG. 1 at the wide-angle end.
Figure 5:
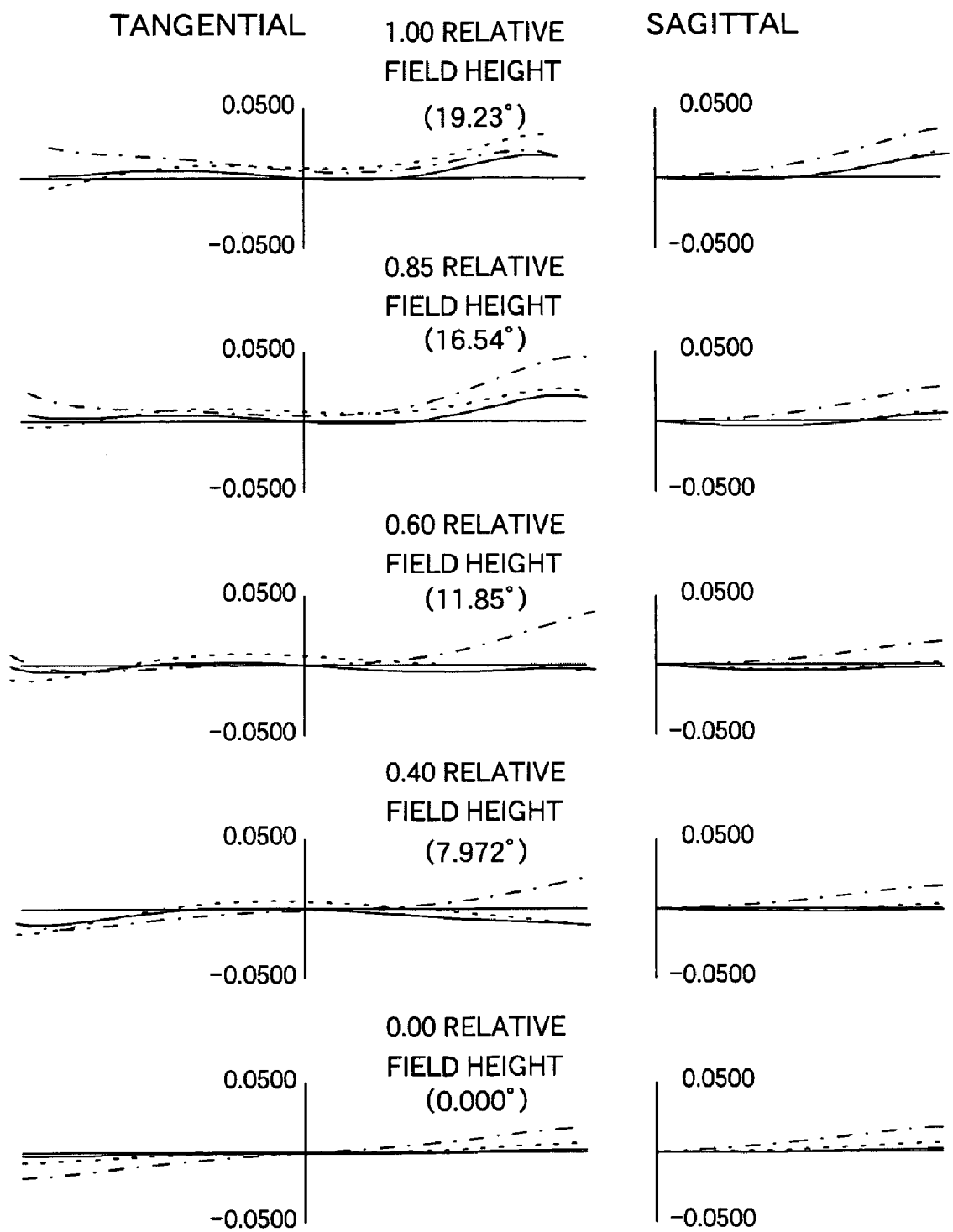
FIG. 5 shows the lateral aberrations of the zoom lens system shown in FIG. 1 at the telephoto end.

In FIGS. 4 and 5, the spherical aberration (expressed in mm) is shown at the wide-angle end and the telephoto end respectively by way of lateral aberration graphs. Values of the spherical aberration for the respective wavelengths of 650.0 nm (broken line), 550.0 nm (solid line), and 450.0 nm (dot-dash line) are shown. In the graphs showing the astigmatism and lateral aberration, the aberration is shown respectively for tangential rays (T) and sagittal rays (S).

The zoom lens system 5 is a zoom lens system composed of five lens groups and is designed so that the difference $\Delta vd4$ between the respective Abbe numbers vd of the negative lens and the positive lens in the cemented lens (balsam lens) in the fourth lens group G4 is at least 50, which makes it possible to sufficiently correct red light with the fourth lens group G4.

This zoom lens system 5 has a correction performance for chromatic aberration, especially including the aberration of red light, by the cemented lens disposed in the fourth lens group highly. The chromatic aberration is corrected mainly by the fourth lens group and requirement of correction (correction load) of the chromatic aberration of the second group G2 and third lens group G3 is suppressed. By doing so, the construction of the third lens group G3 can be simplified, the power of the second lens group G2 can be suppressed, and the power of the first lens group G1 that moves to adjust the focus is also suppressed.

Therefore, this zoom lens has a lens arrangement in that a cemented lens is only used in the fourth lens group G4, so that the constructions of the other lens groups are simplified, and an overall construction of eleven lenses are used where the third lens group G3 is composed of a single lens with a positive refractive power and the second lens group G2 is composed of two positive meniscus lenses. It is also possible to suppress the power of the second lens group G2 and it is therefore possible to set the power of the first lens group G1 low considering the zooming ratio and the field angle of the lens system. It makes possible to provide a compact zoom lens system with a suitable focus adjustment performance where the first lens group G1 is not excessively sensitive when the first lens group G1 moves to adjust the focus. The projection zoom lens 5 has high image-forming performance across the entire range from the wide-angle end to the telephoto end. Using this zoom lens system, it is possible to provide the projector 1 that can project bright images at high resolution.

Although a projector that includes an image generator that has LCDs has been described, the present invention can be applied to a DLP-type projector that includes an image generating device (light valve) that has DMDs. It is also possible to apply the present invention to a rear projector apparatus in which the screen is integrated.

What is claimed is:

1. A zoom lens system that projects, onto a screen, projection light from an image generating device, comprising, in order from a screen side thereof:
   a first lens group with a negative refractive power;
   a second lens group with a positive refractive power;
   a third lens group with a positive refractive power;
   a fourth lens group with a negative refractive power; and
   a fifth lens group with a positive refractive power,
   wherein zooming is performed by moving the second, third and fourth lens groups,
   the fourth lens group is composed of a negative meniscus lens that is concave on an image side, a cemented lens made up of a negative lens that is concave on the screen side and a convex lens, and a positive lens, and the zoom lens system satisfies conditions below $1.15 < f2/fw < 2.0$ $50 < \Delta vd4 < 70$ where fw is a combined focal length of the zoom lens system at a wide-angle end, f2 is a combined focal length of the second lens group, and $\Delta vd4$ is a difference in respective Abbe numbers vd of lenses composing the cemented lens in the fourth lens group.

2. The zoom lens system according to claim 1, wherein the second lens group is composed of two positive meniscus lenses and the third lens group is composed of a positive lens.

3. The zoom lens system according to claim 1, wherein the first lens group is composed, in order from the screen side, of a positive lens, a negative meniscus lens, and a negative lens, and the fifth lens group is composed of a positive lens.

4. The zoom lens system according to claim 1, wherein a combined focal length f1 of the first lens group and the combined focal length fw of the zoom lens system at the wide-angle end satisfy a following condition:

$0.5 < |f1/fw| < 2.0$.

5. The zoom lens system according to claim 1, wherein a combined focal length f1 of the first lens group and the combined focal length fw of the zoom lens system at the wide-angle end satisfy a following condition:

$1.0 < |f1/fw| < 2.0$.

6. A projector apparatus including the zoom lens system according to claim 1 and an image generating device.

\* \* \* \* \*